US008762879B1

(12) United States Patent
Goodger et al.

(10) Patent No.: US 8,762,879 B1
(45) Date of Patent: Jun. 24, 2014

(54) TAB MANAGEMENT IN A BROWSER

(75) Inventors: Ben Goodger, Mountain View, CA (US);
Brian Rakowski, Palo Alto, CA (US);
Linus Upson, Redwood City, CA (US);
Glen Murphy, Mountain View, CA (US); Peter Kasting, San Jose, CA (US)

(73) Assignee: Google Inc., Mountain View, CA (US)

( * ) Notice: Subject to any disclaimer, the term of this patent is extended or adjusted under 35 U.S.C. 154(b) by 704 days.

(21) Appl. No.: 12/551,858

(22) Filed: Sep. 1, 2009

Related U.S. Application Data

(60) Provisional application No. 61/093,439, filed on Sep. 1, 2008.

(51) Int. Cl.
*G06F 3/048* (2013.01)
(52) U.S. Cl.
USPC ............................ 715/777; 715/738; 715/764
(58) Field of Classification Search
USPC ................................................. 715/777, 738
See application file for complete search history.

(56) References Cited

U.S. PATENT DOCUMENTS

| 7,487,455 | B2 * | 2/2009 | Szeto | 715/752 |
| 7,587,679 | B1 * | 9/2009 | Sundermeyer et al. | 715/777 |
| 7,607,092 | B2 * | 10/2009 | Rogers et al. | 715/734 |
| 7,617,461 | B2 * | 11/2009 | Yoshida | 715/777 |
| 7,823,072 | B2 * | 10/2010 | Domenico | 715/752 |
| 7,921,365 | B2 * | 4/2011 | Sauve et al. | 715/738 |
| 8,001,482 | B2 * | 8/2011 | Bhattiprolu et al. | 715/777 |
| 8,077,339 | B2 * | 12/2011 | Nomoto et al. | 358/1.16 |
| 8,498,977 | B2 * | 7/2013 | Gross et al. | 707/708 |
| 2004/0113948 | A1 * | 6/2004 | Shahrbabaki et al. | 345/777 |
| 2005/0235219 | A1 * | 10/2005 | Szeto | 715/788 |
| 2006/0085759 | A1 * | 4/2006 | Knapheide | 715/777 |
| 2006/0230356 | A1 * | 10/2006 | Sauve et al. | 715/777 |
| 2006/0271858 | A1 * | 11/2006 | Yolleck et al. | 715/738 |
| 2007/0067733 | A1 * | 3/2007 | Moore et al. | 715/777 |
| 2007/0088680 | A1 * | 4/2007 | Sauve et al. | 707/3 |
| 2008/0005686 | A1 | 1/2008 | Singh | |
| 2008/0065237 | A1 * | 3/2008 | Long | 700/3 |
| 2008/0077879 | A1 * | 3/2008 | Black | 715/784 |
| 2008/0189645 | A1 * | 8/2008 | Kapanen et al. | 715/777 |
| 2009/0006201 | A1 * | 1/2009 | Faseler, Jr. | 705/14 |
| 2009/0006981 | A1 * | 1/2009 | Pagan | 715/752 |
| 2009/0031227 | A1 * | 1/2009 | Chakrabarti et al. | 715/763 |
| 2009/0164934 | A1 * | 6/2009 | Bhattiprolu et al. | 715/777 |
| 2009/0228824 | A1 * | 9/2009 | Forstall et al. | 715/779 |
| 2009/0265716 | A1 * | 10/2009 | Prashanth | 719/312 |
| 2009/0327947 | A1 * | 12/2009 | Schreiner et al. | 715/777 |
| 2010/0011313 | A1 * | 1/2010 | Sauve et al. | 715/777 |
| 2010/0115451 | A1 * | 5/2010 | Moore et al. | 715/777 |
| 2011/0072391 | A1 * | 3/2011 | Hanggie et al. | 715/800 |
| 2011/0314408 | A1 * | 12/2011 | Yolleck et al. | 715/777 |

OTHER PUBLICATIONS

FileMaker Pro 9: The Missing Manual, Coffey et al. (Aug. 2, 2007) O'Reilly Media, Inc., chapter 6, section 10 Tab Control.*
Grosskurth, A., and Godfrey, M.W., "A Reference Architecture for Web Browsers", *Proceedings of the 21st IEEE International Conference on Software Maintenance*, IEEE Computer Society, Budapest, Hungary, Sep. 2005, 4 pages.
Weinreich, H., et al., "Off the Beaten Tracks: Exploring Three Aspects of Web Navigation", *Proceedings of the 15th International Conference on World Wide Web*, ACM Press, Edinburgh, Scotland, May 2006, 10 pages.

* cited by examiner

*Primary Examiner* — William Titcomb
(74) *Attorney, Agent, or Firm* — Sterne, Kessler, Goldstein & Fox P.L.L.C.

(57) ABSTRACT

The present invention relates to tab management in a browser, such as a web browser. In a first embodiment, a method creates a new tab in a browser on a device. An opener tab that opened the new tab is determined on the device. A tab opened from the opener tab is determined on the device. Finally, the new tab is positioned, on the device, adjacent to the tab opened from the opener tab.

6 Claims, 22 Drawing Sheets

TAB MANAGEMENT IN A BROWSER

This application claims the benefit of U.S. Provisional Appl. No. 61/093,439, filed Sep. 1, 2008, incorporated by reference herein in its entirety.

BACKGROUND

1. Field of the Invention

The present invention generally relates to browsers.

2. Related Art

A browser is an application that retrieves content and enables a user to interact with that content. In an example, a browser may retrieve content across one or more networks, such as the Internet. The INTERNET EXPLORER 7 browser from MICROSOFT is a type of web browser. Other examples of browsers are the SAFARI browser from APPLE, the OPERA browser from OPERA SOFTWARE, and the CAMINO browser available at http://www.caminobrowser.org/.

Some browsers provide a tabbed interface. The FIREFOX 2 browser, available at http://www.mozilla.com/, is an example of a browser with a tabbed interface. In a tabbed interface, each browser window may have multiple tabs displayed on a tab management area with each tab able to display a page. In a single window, only one page is visible at a time. If a user selects a tab on a tab management area, a page associated with the tab is displayed. Each browser window can contain many tabs, allowing the user to open many pages inside a single window.

Many browsers open tabs in a left to right manner. New tabs are always placed on the right side of the tab management area. The INTERNET EXPLORER 7 browser has an option to always insert new tabs to the right of a selected tab. Opening tabs in this way can cause related tabs to be positioned in different parts of a tab management area.

When closing a selected tab, tabbed browsers have to determine another tab to select. Many tabbed browsers select a tab to the right of the closed tab if there is an open tab to the right of the closed tab. Otherwise, the tabbed browsers select a tab to the left of the closed tab. Selecting tabs in this way may cause the browser to switch between unrelated tabs. Switching between unrelated tabs may be disorienting to a user.

As a user browses, a tabbed browser opens new tabs. Tabs can accumulate that are no longer relevant to a user. For this reason, a user may want to close a multiple tabs rapidly. Some browsers provide an option enabling a user to "close all other tabs". In other words, a user may close all the tabs but one. While this approach has benefits, this approach may close tabs that are still relevant to a user.

BRIEF SUMMARY

The present invention relates to tab management in a browser, such as a web browser. In a first embodiment, a method creates a new tab in a browser on a device. An opener tab that opened the new tab is determined on the device. A tab opened from the opener tab is determined on the device. Finally, the new tab is positioned, on the device, adjacent to the tab opened from the opener tab.

In a second embodiment, a system creates a new tab in a browser. The system includes a tab opener module that determines an opener tab that opens the new tab. The tab opener module determines an old tab opened from the opener tab and positions the new tab adjacent to the old tab.

In a third embodiment, a method closes a tab in a browser on a device. A page associated with a first tab is displayed. The first tab is closed on the device. The opener tab that opened the first tab is determined on the device. A second tab opened from the opener tab is determined on the device. Finally, a page is displayed associated with the second tab on the device.

In a fourth embodiment, a system closes a tab in a browser. The system includes a tab manager module that closes a first tab. A page associated with the first tab was displayed. The system also includes a tab selector module that determines an opener tab that opened the first tab. The tab selector module also determines a second tab opened from the opener tab and causes a page associated with the second tab to be displayed.

In a fifth embodiment, a computer-implemented method closes a tab in a browser on a device. A user input requesting all tabs opened from an opener tab to be closed is received on the device. A set of tabs opened from the opener tab is determined on the device. Finally, each tab in the set of tabs is closed on the device.

In a sixth embodiment, a computer-implemented method closes a tab in a browser on a device. A user input requesting all tabs to one side of a tab to be closed is determined on the device. A set of tabs to the side of the tab is determined. Finally, each tab in the set of tabs is closed on the device.

In a seventh embodiment, a system provides tabbed browsing. The system includes a tab opener module that determines a first opener tab that opens a first tab, determines a second tab opened from the opener tab and positions the first tab adjacent to the second tab. A tab manager module displays a page associated with a third tab and closes the third tab. A tab selector module determines a second opener tab, determines a fourth tab opened from the second opener tab, and causes a page associated with the fourth tab to be displayed. A tab refresh module receives a first user input to select a close button on a tab with a pointer. The close button located at a screen position. Finally, the tab refresh module renders a tab management area such that a close button of a remaining tab is located at the screen position.

Further embodiments, features, and advantages of the invention, as well as the structure and operation of the various embodiments of the invention are described in detail below with reference to accompanying drawings.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIG. 1 is a diagram with a screenshot of a browser system with a tabbed browsing interface.

FIGS. 10A-B are diagrams illustrating an example of the method for rapidly closing tabs shown in FIG. 8.

The drawing in which an element first appears is typically indicated by the leftmost digit or digits in the corresponding reference number. In the drawings, like reference numbers may indicate identical or functionally similar elements.

DETAILED DESCRIPTION

Introduction

Figure 2:
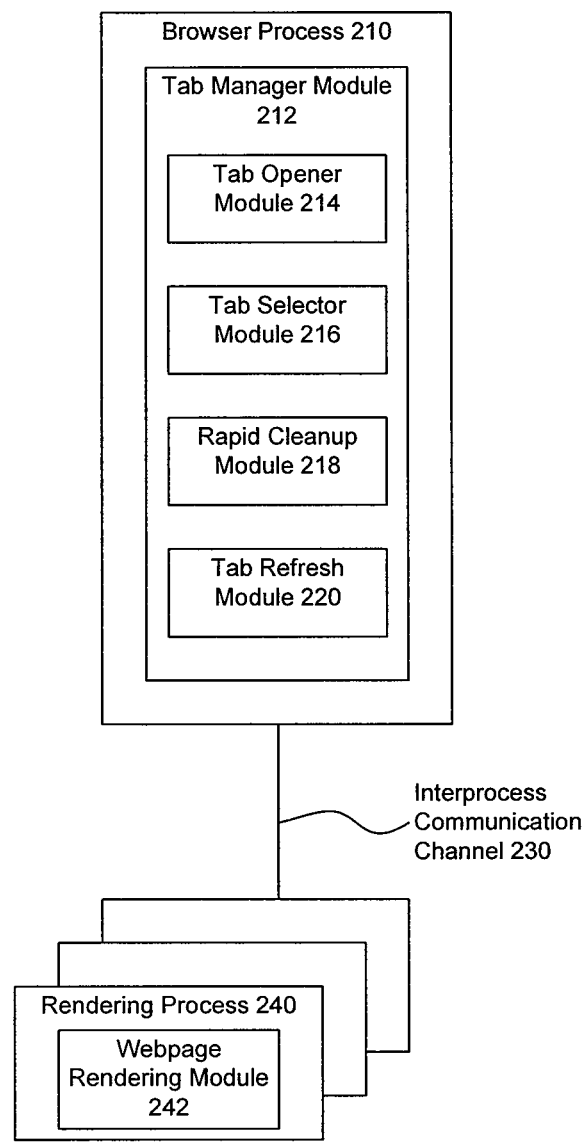
FIG. 2 is a diagram illustrating a browser system using tab management heuristics according to an embodiment.

Embodiments of the present invention provide heuristics to improve tab management in a browser, such as a web browser. In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
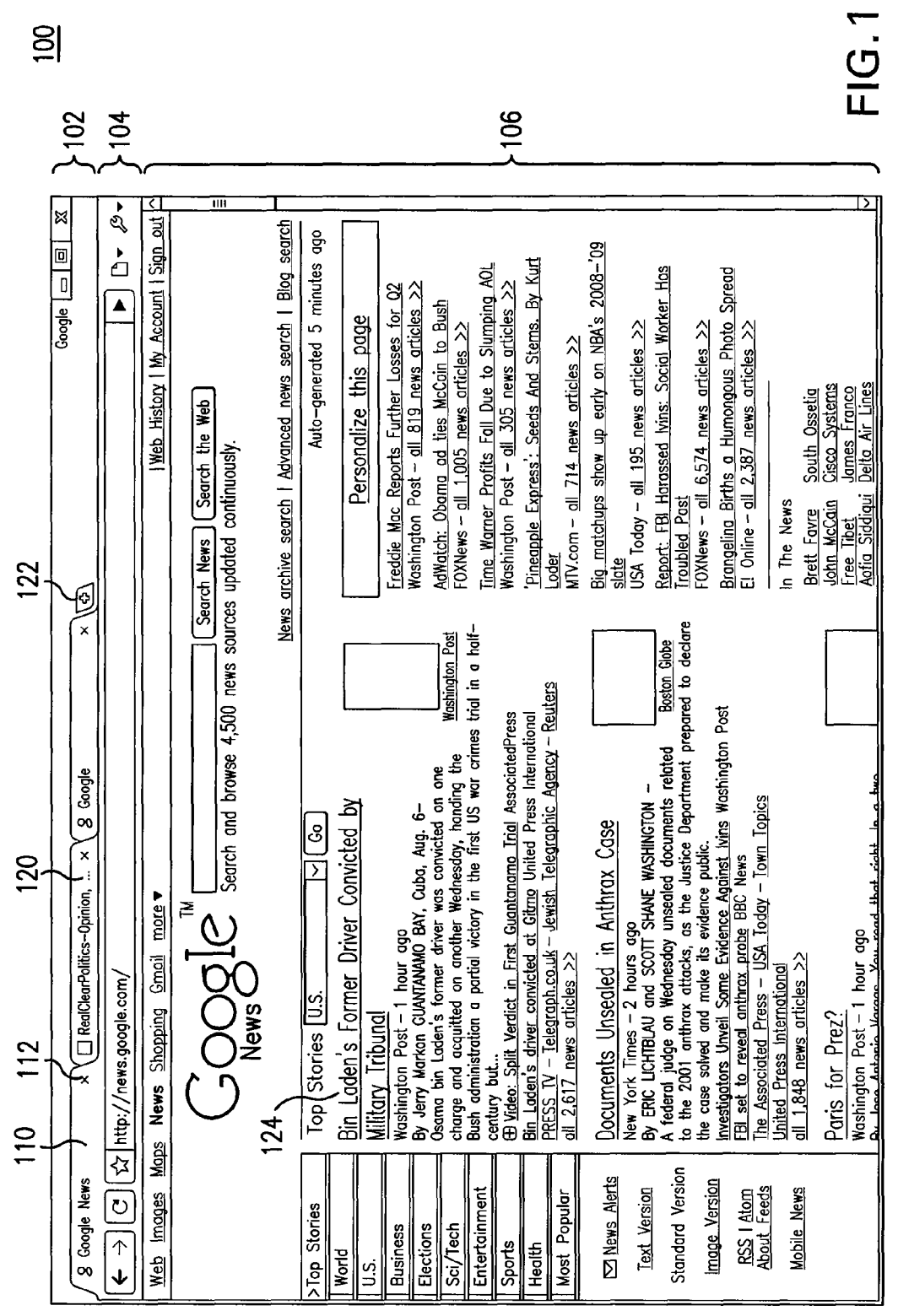

FIG. 1 shows a diagram 100 with a screenshot of a browser system with a tabbed browsing interface. The interface includes a content area 106, a navigation control area 104 and a tab management area 102. Content area 106 may display a page with an address shown tab management area 102. In diagram 100, navigation control area 104 shows an address "http://news.google.com" and content area 106 displays a GOOGLE NEWS page that corresponds the address. Additionally, navigation control area 104 may be used to navigate to a different page using, for example, an address field or a forward or back button. The forward and back buttons enable a user to navigate forward and backwards in the history for that tab. The address field may display an address of a page displayed in content area 106 and may enable a user to navigate to a new page by entering a new address the address field. Each tab may have a navigation control area 104 within the tab.

To switch between tabs, a user may use tab management area 102. Tab management area 102 includes several tabs, including a tab 110 and a tab 120. Each tab may have a corresponding page, and each tab may display an icon and a title that corresponds to its page. In diagram 100, tab 110 has a GOOGLE NEWS page and tab 120 has a page entitled "RealClearPolitics". At any one time, a single tab may be selected. The page corresponding to the selected tab may be displayed in content area 106. In diagram 100, tab 110 is selected. Thus, its corresponding GOOGLE NEWS page is displayed in content area 106. When the user selects tab 120 by, for example, clicking on the tab with a pointer, the page entitled "RealClearPolitics" would be displayed in content area 106. In this way, the user can quickly and easily switch between pages.

A user may open a tab in at least three ways. First, a tab may be opened empty by the user for the purpose of subsequently navigating to a new page. A user may open an empty tab by, for example, selecting a user interface button (such as a button 122), inputting keyboard shortcut (such as control+T) or selecting a menu item. Second, a tab may be opened by the user to show a particular page. For example, a user may open a tab to show a particular page by holding down a modifier (such as a keyboard button) while clicking on a link (such as a link 124) on a web page or by using a context menu for a link. Right clicking on a link may display a context menu showing actions that may be taken with the link. One such action may be to open link in new tab. Third, a page may request that a link be opened in a new tab. For example, an HTML tag representing link 124 may include an attribute instructing the browser to open a page in a new tab when a user clicks on link 124.

When a new tab is opened, the new tab is positioned in tab management area 102. Positioning the tab to the far right may hide a potentially relevant tab and the user may not even notice that it popped up. Conversely, positioning the tab to the far left may put it ahead of potentially more relevant tabs. A first embodiment positions the new tab intuitively to a user.

In addition to opening tabs, a user also may close a tab. A user may close a tab by, for example, selecting a close button, such as a close button 112. As mentioned earlier, in diagram 100 tab 110 is selected and a page corresponding to tab 110 is displayed in content area 106. Clicking on close button 112 causes tab 110 to close. When selected tab 110 closes, the browser system determines another tab to become the selected tab and displays a page corresponding to the newly selected tab accordingly. Displaying an unrelated page on close can be disorienting to a user. A second embodiment determines a tab with a related page to display so closing a selected tab is less disorienting to a user.

As the user browses to different pages, a browser interface may have a tendency to open a large number of tabs. Many of these tabs are extraneous. But closing lots of tabs may require many mouse movements and mouse clicks. A third embodiment presents methods for closing several tabs in response to a single user interface gesture. In contrast, a fourth embodiment presents a method enabling a user to close tabs one at a time without moving a mouse pointer. These embodiments are described in detail in the detailed description that follows.

This detailed description is divided into sections. A first section describes a browser system using tab management heuristics according to an embodiment. A second section describes a method for positioning the new tab. A third section describes a method for determining a tab to select and display when a selected tab is closed. A fourth section describes a method for closing several tabs in a single user interface gesture. Finally, a fifth section describes a method enabling a user to close tabs one at a time without moving a mouse pointer.

System

This section describes a browser system using tab management heuristics according to an embodiment of the present invention. FIG. 2 is a diagram illustrating a browser system 200 using tab management heuristics according to an embodiment.

Browser system 200 includes a browser process 210 coupled to a renderer process 240. Browser system 200 includes a browser process 210 and renderer process 240. Browser process 210 retrieves web content and communicates with renderer process 240 to render the web content. Although browser process 210 and renderer process 240 are illustrated in separate processes it would be understood by those skilled in the art that they can be combined into a single process. Further, there may be one or more renderer processes 240. For example, there may be one renderer process 240 for each tab.

Browser process 210 can communicate with one or more web servers (not shown) over one or more networks, such as the Internet, to retrieve content. Browser process 210 can communicate with an input (not shown) to allow a user to input data, to input commands, or to provide other control information to browser process 210. Browser process 210 includes a tab manager module 212 that may control creation and destruction of the various tabs and renderer processes 240. Tab manager module 212 also may control how the tabs are ordered within a tab management area, such as tab management area 102 in FIG. 1.

Once browser process 210 retrieves web content, browser process 210 may communicate with renderer process 240 to render and display the content in a tab. Browser process 210 may communicate with renderer process 240 via an inter-process communication channel 230. Inter-process communication channel 230 may be any type of inter-process communication including a shared memory or named pipe.

Renderer process 240 includes a webpage rendering module 242. Webpage rendering module 242 may be an application framework that provides some of core functions of browser system 200. For example, webpage rendering module 242 may maintain a data structure representing all or part of the web content displayed to a user on a page. Webpage rendering module 242 may also interpret and render some of the web content. Webpage rendering module 242 may render the content in a content area, such as content area 106 in FIG. 1. For example, webpage rendering module 242 may parse and render HTML and XML. Webpage rendering module 242 also may execute some scripts embedded in the web content, such as JavaScript. When webpage rendering module 242 encounters content requiring a plug-in, webpage rendering module 242 may call a web plug-in to interpret the plug-in. Webpage rendering module 242 can include, but is not limited to, WebKit available at http://webkit.org/.

In an embodiment, webpage rendering module 242 may also render a navigation control area, such as navigation control area 104 in FIG. 1. As mentioned earlier, each tab may have a corresponding navigation control area 104 within the tab. Webpage rendering module 242 may render navigation control area 104 when the tab is newly instantiated. Further, webpage rendering module 242 may re-render navigation control area 104 when the user switches between tabs or when the user navigates to new pages.

As mentioned earlier, browser process 210 includes tab manager module 212 that creates, destroys, orders and otherwise manages tabs, such as the tabs in tab management area 102 in FIG. 1. Tab manager module 212 includes a tab opener module 214, a tab selector module 216, a rapid cleanup module 218, and a tab refresh module 220. Each module is briefly described in turn.

Tab opener module 214 opens a new tab. Tab opener module 214 may open a tab in response to any of the three scenarios described above. Tab opener module 214 may open a tab in response to (1) a user input requesting that a new, perhaps blank tab be opened, (2) a user input requesting that a page be opened in a new tab, or (3) an instruction, such as an HTML attribute or a JavaScript command, requesting that a page be opened in a new tab. In an embodiment, tab opener module 214 may open a tab by instantiating a new rendering process 240.

When opening a new tab, tab opener module must determine where on a tab management area to place the tab. When a new tab is opened using the second or third method above, there is a tab from which the tab is opened. This tab may be referred to as an opener tab. In the second method, a user may select a link in the opener tab and request that the linked page be opened in the new tab by, for example, right clicking and selecting from a menu. In the third method, the opener tab may have a page with an HTML attribute instructing the browser to open a linked page in a new tab. Either way, when tab opener module 214 opens a new tab, tab opener module 214 may identify and store the opener tab.

With the opener tab determined, tab opener module 214 may determine other tabs opened from the opener tab. When there are no other tabs opened from the opener tab, the new tab may be positioned adjacent to (such as to the left or right of) the opener tab in the tab management area. Otherwise, tab opener module 214 may determine the tab most recently opened by the opener tab prior to opening the new tab. After determining the most recently opened tab, tab opener module 214 may position the new tab adjacent to (such as to the left or right of) the most recently opened tab. Tabs opened by the same opener tab tend to be related. By grouping tabs together by opener tab, tab opener module 214 may position related tabs together in a more organized manner. The operation of tab opener module 214 is described in greater detail with respect to FIG. 3 and FIGS. 4A-B.

As mentioned earlier, a user may close a tab by, for example, selecting a close button, such as button 112 in FIG. 1. In an embodiment, when tab manager module 212 closes a tab, tab manager module 212 may kill a renderer process 240. A user may close a tab that is selected and had its corresponding page displayed. In that case, when tab manager module 212 closes a tab, tab selector module 216 may determine a new tab to select and display.

To determine which tab to select and display, tab selector module 216 may determine a tab that opened the tab being closed (referred to as "the opener tab"). In an embodiment, tab manager module 212 may store each tab's corresponding opener tab when each tab is created.

Once the opener tab is determined, tab selector module 216 determines other tabs opened from the opener tab. Tab selector module 216 may select a tab from the set of tabs opened from the opener tab. A page of the newly selected tab may be displayed in a content area of the browser interface. Tab selector module 216 may select a tab from the set of tabs that was adjacent to the closed tab. As mentioned earlier, tabs with a common opener tab are often related. So, when a user closes a selected tab, tab selector module 216 directs a user to a related tab. By switching the user between related tabs, tab selector module 216 may provide a more intuitive user experience. The operation of tab selector module 216 is described in greater detail with respect to FIG. 5 and FIGS. 6A-D.

As the user browses, tabs may start to accumulate in the browser interface. A user may want to rapidly close multiple tabs. Rapid cleanup module 218 enables a user to close multiple tabs. Rapid cleanup module 218 may receive a user input requesting all tabs opened from an opener tab to be closed. For example, in response to a user right clicking a tab, a menu may appear. On the menu, there may be options to close multiple tabs. In an embodiment, there may be an option to close all tabs one side (such as all tabs to the right or left) of the tab. When a user selects that option, rapid cleanup module 218 determines a set of tabs on that side of the tab. Then, rapid cleanup module 218 closes each tab in the set of tabs.

In another embodiment, when a user right clicks on a tab, the menu may include an option to close all tabs opened from the tab. When a user selects that option, rapid cleanup module 218 determines a set of tabs opened from the opener tab.

Then, rapid cleanup module 218 closes each tab in the set of tabs. Often, tabs that share an opener page are related. Thus, rapid cleanup module 218 enables a user to close rapidly multiple related tabs. The operation of rapid cleanup module 218 is described in greater detail with respect to FIGS. 7-8, 9A-B, and 10A-B.

As discussed above, rapid cleanup module 218 enables a user to close multiple tabs in a single user interface gesture. In contrast, tab refresh module 220 enables a user to close one tab at a time quickly and easily. Tab refresh module 220 may receive a first user input to select a close button on a tab with a pointer. The close button located at a particular screen position. In response to the user input, tab refresh module 220 may render a tab management area such that a close button of a remaining tab is located at the screen position. To render a tab management area, tab refresh module 220 may translate the remaining tabs to the left. The remaining tabs may stay approximately the same width. Alternatively, tab refresh module 220 may render tab management area to enlarge the remaining tabs. When a user moves his pointer away from the tab management area, tab refresh module may render the tab management area to better utilize screen space. The operation of tab refresh module 200 is described in greater detail with respect to FIGS. 11, 12A-D, and 13A-C.

Browser system 200 may be implemented on any computing device that can support browsing. Such a computing device can include, but is not limited to, a personal computer, mobile device such as a mobile phone, workstation, embedded system, game console, television, set-top box, or any other computing device that can support browsing. Such a computing device may include, but is not limited to, a device having a processor and memory for executing and storing instructions. Such a computing device may include software, firmware, and hardware. Software may include one or more applications and an operating system. Hardware can include, but is not limited to, a processor, memory and graphical user interface display.

Tab manager module 212, tab opener module 214, tab selector module 216, rapid cleanup module 218, tab refresh module 220, webpage rendering module 242 are shown in FIG. 2 in two separate processes. However, each of the modules may be combined into one or more processes as would be apparent to a person of skill in the art. Also, each of the modules may be implemented in hardware, software, firmware or any combination thereof.

The operation of tab manager module 212 and its submodules is described in more detail in the sections below.

Tab Ordering on Creation

Figure 3:
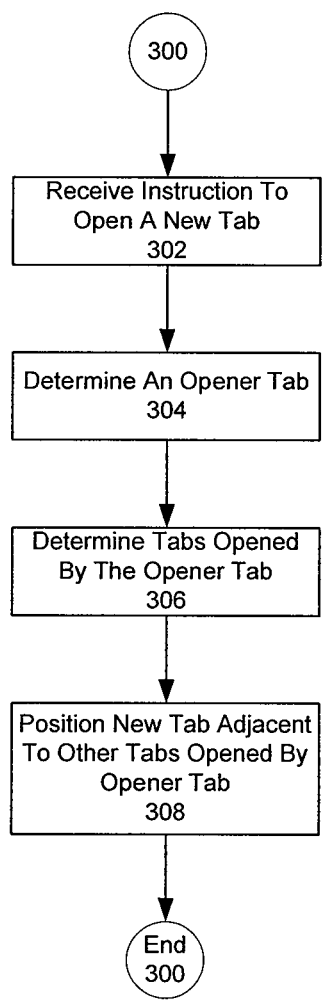
FIG. 3 is a flowchart illustrating a method for opening a tab according to an embodiment.

FIG. 3 shows a flowchart illustrating a method 300 for opening a tab according to an embodiment. For clarity, method 300 is described with respect to browser system 200 and tab opener module 214 in FIG. 2. However, method 300 may be used in other systems known to those of skill in the art.

Method 300 begins by receiving an instruction to open a new tab at step 302. The instruction to open a new tab may be in response to a user input. For example, a user may right click on a link and select an option to open a page in a new tab. In another example, a page may include an instruction to open a link in a new tab. A page may include an HTML attribute instructing tab opener module 214 to open a page in a new tab.

In response to the instruction received at step 302, tab opener module 214 determines an opener tab at step 304. The opener tab is the tab from which the new tab is opened. When a user opens a tab by right clicking on link, the tab displaying the page that includes the link is the opener tab. When a tab is opened in response to an instruction on a page, the tab displaying the page that includes the instruction is the opener tab.

Once the opener tab is determined, tab opener module 214 determines any other tabs opened by the opener tab at step 306. At step 308, tab opener module 214 positions the new tab adjacent to any other tabs opened by the opener tab at step 306. The new tab may be positioned to the right or left of the other tabs opened by the opener tab. If no other tabs are opened by the opener tab, the new tab is positioned adjacent to the opener tab. The new tab may be positioned to the right or left of the opener tab. An example of step 308 is illustrated in FIGS. 4A-B.

Figure 4A:
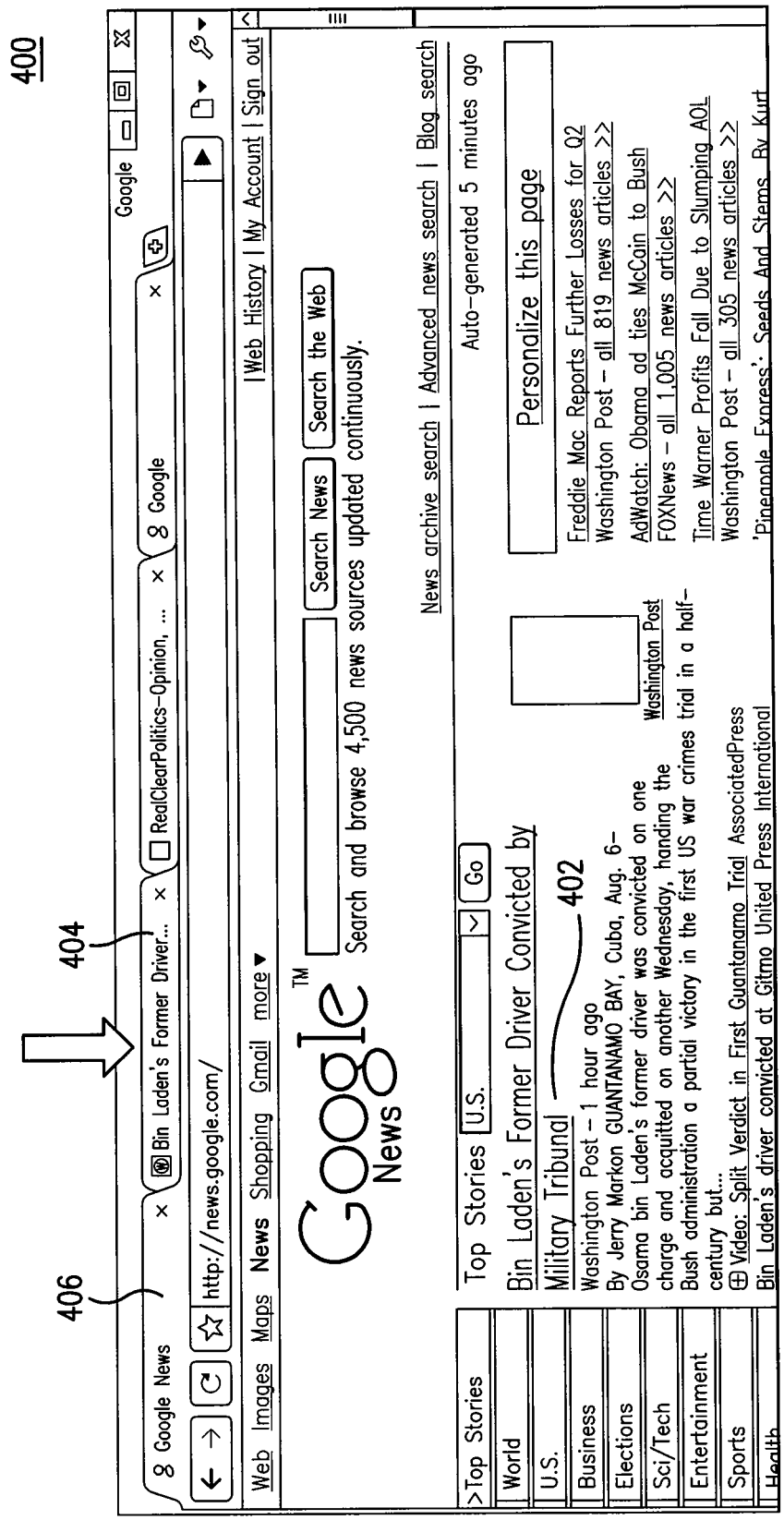
FIGS. 4A-B are diagrams illustrating an example of the method for opening a tab shown in FIG. 3.
Figure 4B:
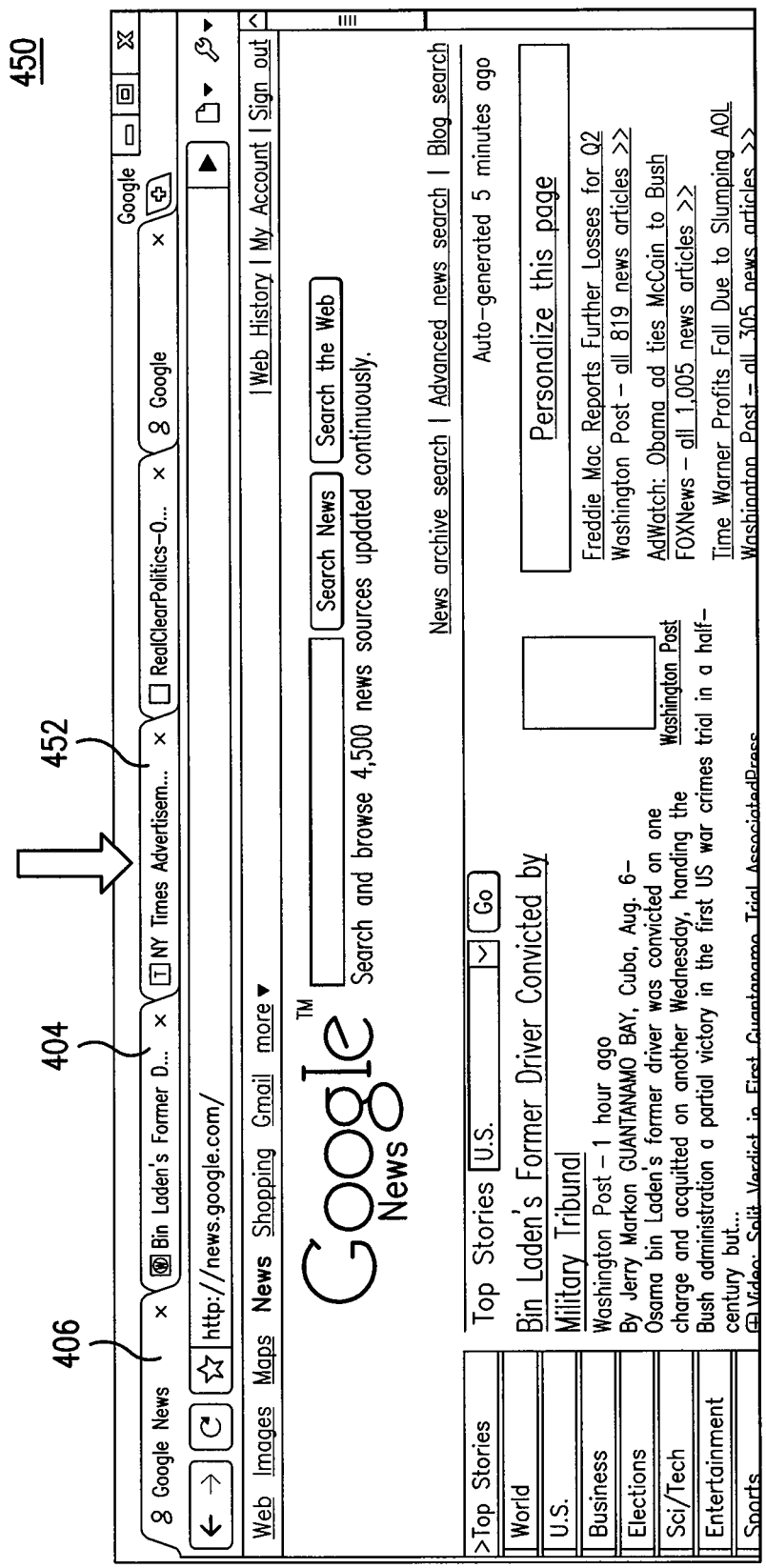

FIGS. 4A-B are diagrams illustrating an example of the method for opening a tab shown in FIG. 3. FIG. 4A shows a diagram 400 with a screenshot of a browser system. In diagram 400, a user has selected a link 402 displayed in a tab 406. A user may right click link 402 and select a menu option to open a new tab, or link 402 may include an instruction to open a new tab. Either way, a new tab 404 is opened. New tab 404 is opened from tab 406 making tab 406 an opener tab. There are no other tabs opened from opener tab 406. Therefore, new tab 404 is positioned adjacent to opener tab 406.

FIG. 4B shows a diagram 450 with a screenshot of a browser system. In diagram 450, a new tab 452 is opened. New tab 452 is opened from opener tab 406. Opener tab 406 has also opened tab 404. Thus, new tab 452 is opened adjacent to tab 404. In this way, new tabs with the same opener tab are grouped together. Tabs that have the same opener tab are often related. By grouping related tabs together, embodiments provide a more intuitive user experience.

Tab Selection on Closing

Figure 5:
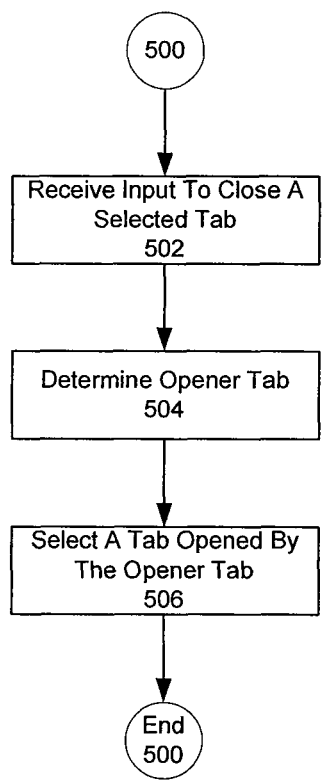
FIG. 5 is a flowchart illustrating a method for selecting a new tab according to an embodiment.

FIG. 5 is a flowchart illustrating a method 500 for selecting a new tab according to an embodiment. For clarity, method 500 is described with respect to browser system 200 and tab selector module 216 in FIG. 2. However, method 500 may be used in other systems known to those of skill in the art.

Method 500 begins at step 502 by receiving an input to close a selected tab. As discussed above, at any one time, a tab may be selected and a page corresponding to the tab may be displayed. A user may close a tab by, for example, selecting a close button or select a close option from a menu. When a selected tab is closed, tab selector module 216 determines a tab to select and displays a page corresponding to the newly selected tab.

To select a tab, tab selector module 216 first determines an opener tab at step 504. At step 506, tab selector module 216 selects a tab that was opened by the same opener tab and was adjacent to the closed tab. Steps 504 and 506 are illustrated in an example in FIGS. 6A-D.

Figure 6A:
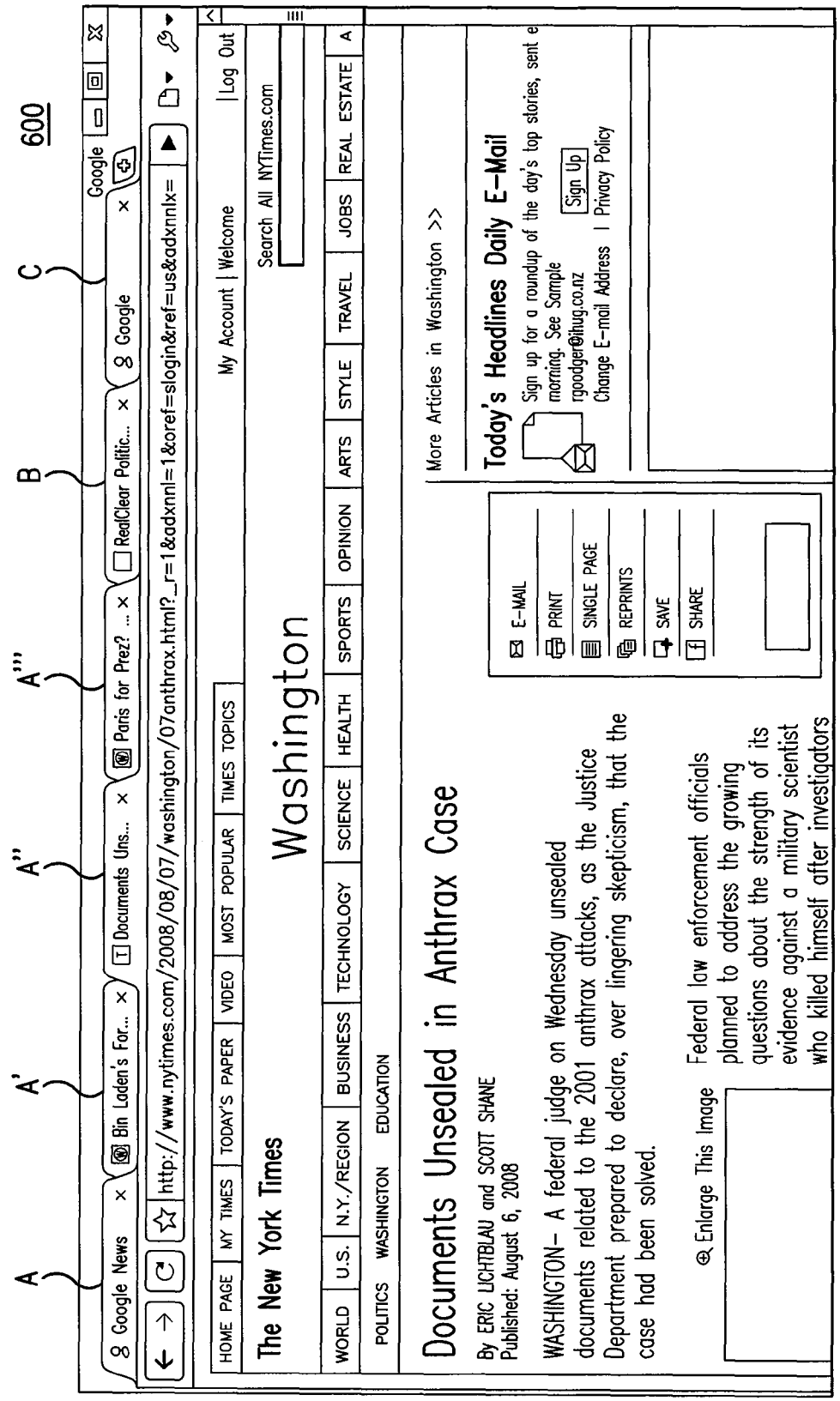
FIGS. 6A-D are diagrams illustrating an example of the method for selecting a new tab shown in FIG. 5.

FIGS. 6A-D show diagrams illustrating an example of the method for selecting a new tab shown in FIG. 5. FIG. 6A shows a diagram 600 illustrating a tabbed browsing interface. Diagram 600 shows an opener tab A and tabs A', A", and A'" which were opened from opener tab A. In diagram 600, tab A" is selected.

Figure 6B:
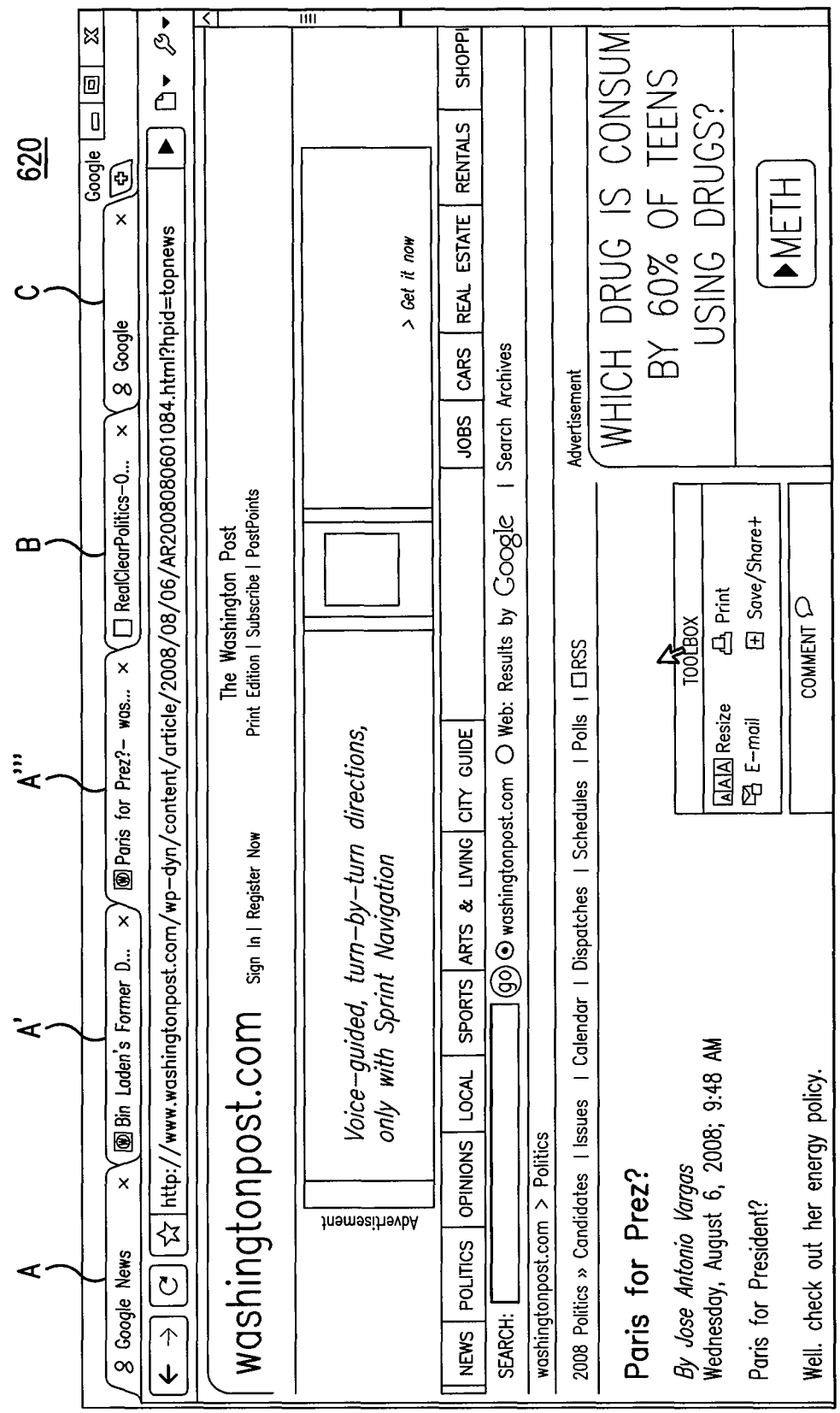

FIG. 6B shows a diagram 620 illustrating the tabbed browsing interface after tab A" is closed. In addition to tab A", the opener tab A has also opened tab A' and tab A'". tab selector module 216 selects a tab from among the tabs opened by tab A which was adjacent to tab A". In an example, tab selector module 216 may select a tab which is to the left of tab A" when available. When no tab opened from tab A is to the left of tab A", tab selector module 216 may select a tab to the right of tab A". In diagram 620, tab A'" is opened by tab A and is to the left of tab A" before tab A" was closed. Thus, tab A'" is selected.

Figure 6C:
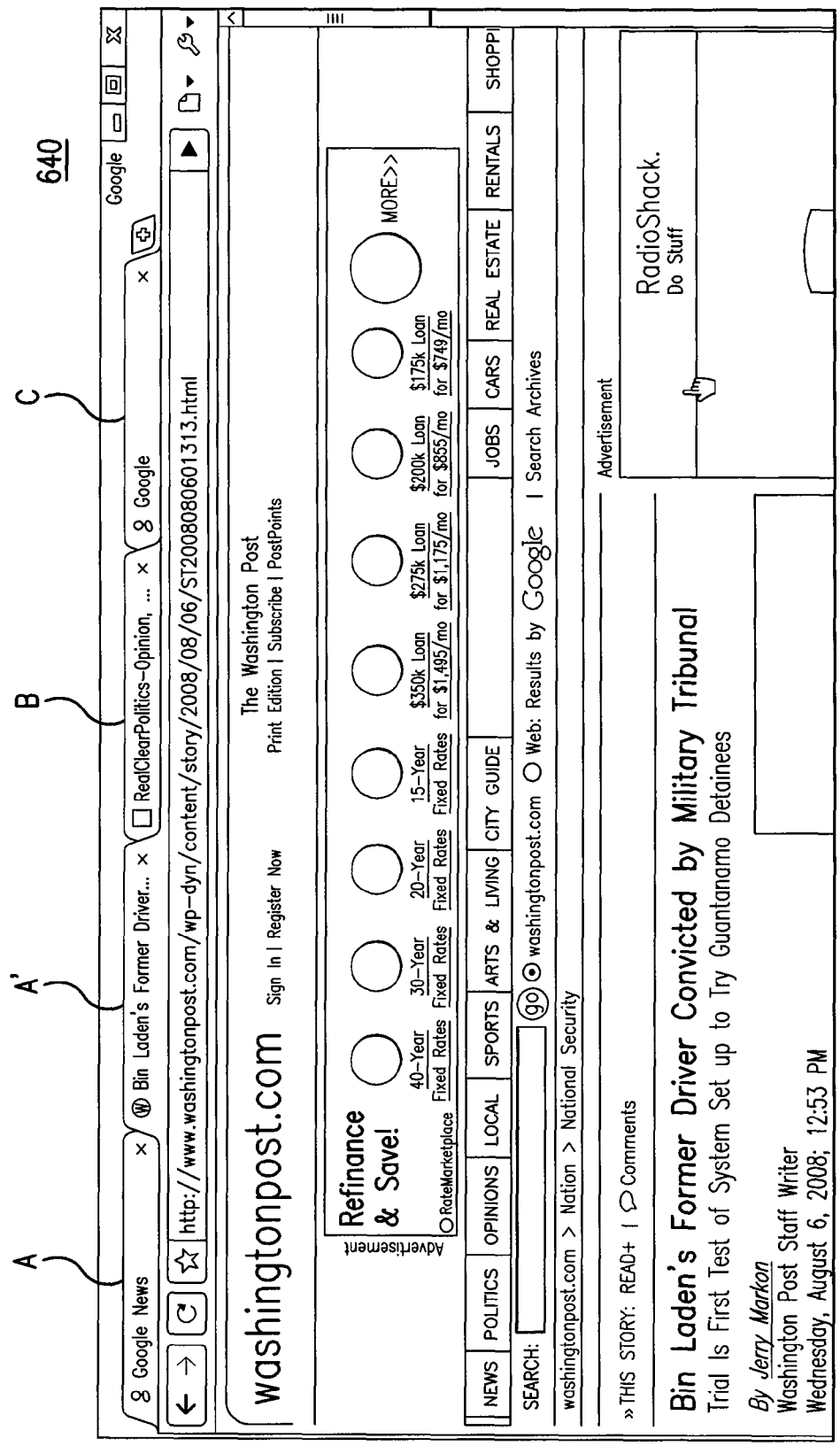

FIG. 6C shows a diagram 640 illustrating the tabbed browsing interface after tab A'" is closed. Once tab A'" is closed, tab selector module 216 determines tab A' is the only tab remaining opened by opener tab A. Thus, tab selector module 216 selects tab A'

Figure 6D:
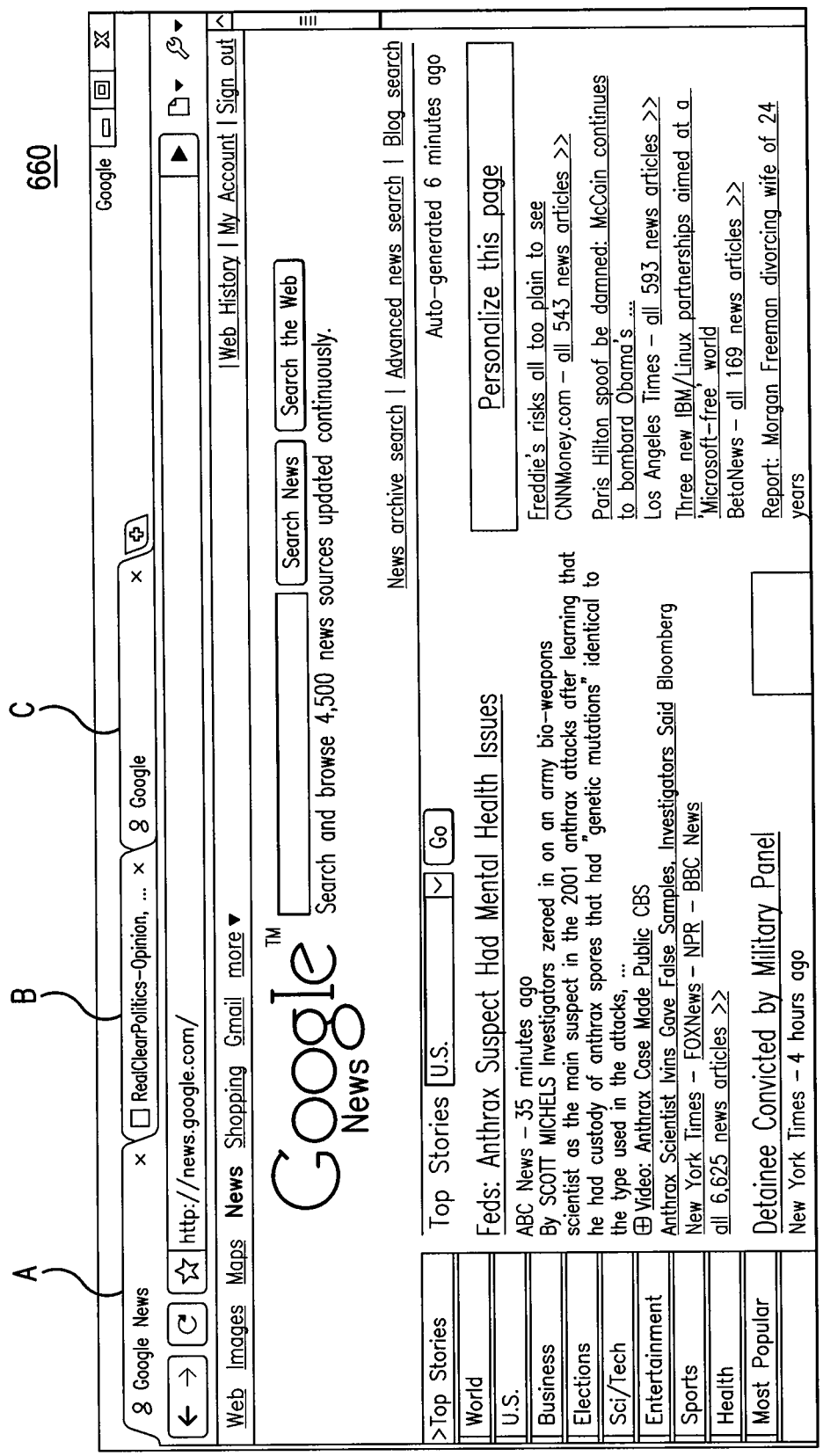

FIG. 6D shows a diagram 660 illustrating the tabbed browsing interface after tab A' is closed. In diagram 660, there are no remaining tabs opened by tab A. When there are no remaining tabs opened by an opener tab, tab selector module 216 selects the opener tab. Thus, tab selector module 216 selects opener tab A. As mentioned before, tabs with the same opener tab tend to be related. By switching between tabs with a common opener tab, tab selector module 216 may switch between related tabs. Switching between related tabs provides a more satisfying user experience.

In an embodiment, when a new, perhaps blank tab is opened by the user without opening a particular page, the tab may be opened at the end of the tab strip. However, the browser system may still store an opener relationship identifying the opener tab. Storing the opener relationship, the browser system can switch between that tab and other tabs with the same opener relationship as described above.

Certain events can be used as an indication that certain tabs with the same opener tab are not, in fact, related. When those events occur, opener relationships may be deleted or deactivated. With the opener relationships deleted or deactivated on a tab, the browser system is not going to switch to the tab. In examples, opener relationships may be deleted or deactivated (1) when the user navigates to a new page, (2) when the user types a new URL or (3) when the user searches and navigates by selecting a bookmark or any other link from a browser interface or a new tab page. A new tab page may be displayed when a user opens a new tab and may include links to other pages. In contrast, opener relationships may not be forgotten when a user navigates to a new page from a new tab page. Also, the opener relationship may not be forgotten when the user selects a tab having the same opener tab.

By providing heuristics selecting tabs, embodiments provide a more satisfying user experience.

Rapid Tab Cleanup

Figure 7:
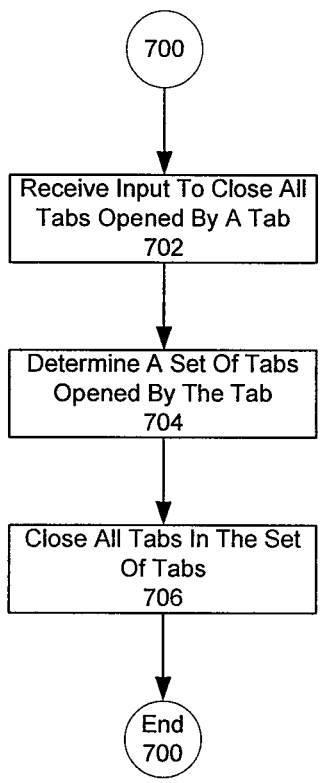
FIGS. 7-8 are flowcharts illustrating methods for rapidly closing tabs according to an embodiment.
Figure 8:
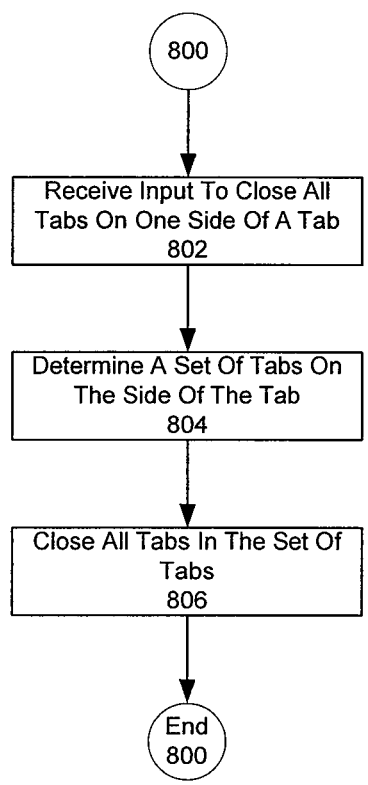

As mentioned earlier, irrelevant tabs may accumulate in the tab management area that a user may want to rapidly close. FIGS. 7-8 are flowcharts illustrating methods for rapidly closing tabs according to an embodiment. For clarity, the methods in FIGS. 7-8 may be described with respect to browser system 200 and rapid cleanup module 218 in FIG. 2. However, the methods in FIGS. 7-8 may be used in other systems known to those of skill in the art.

FIG. 7 is a flowchart illustrating a method 700 for closing all the tabs opened by a tab. Method 700 begins by receiving an input at step 702. One example input is illustrated in diagram 900 of FIG. 9A. Diagram 900 shows a tabbed browsing interface with tabs A, B, B', B'', and C. Tabs B' and B'' have been opened by tab B. Diagram 900 also shows a menu 902. Menu 902 may be opened by right clicking tab B. Menu 902 includes an option 904 to "close tabs opened by this tab". When a user selects option 904, rapid cleanup module 218 may receive a user input at step 702. The user input may indicate an opener tab.

Figure 9A:
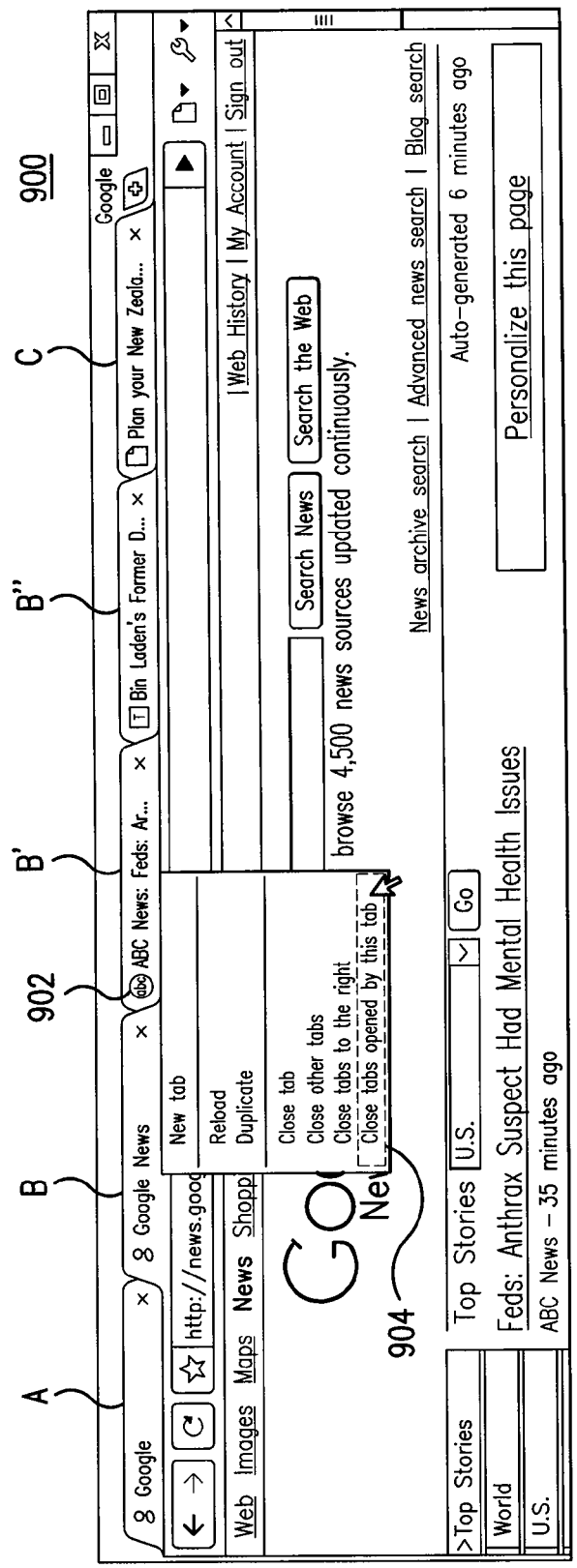
FIGS. 9A-B are diagrams illustrating an example of the method for rapidly closing tabs shown in FIG. 7.
Figure 9B:
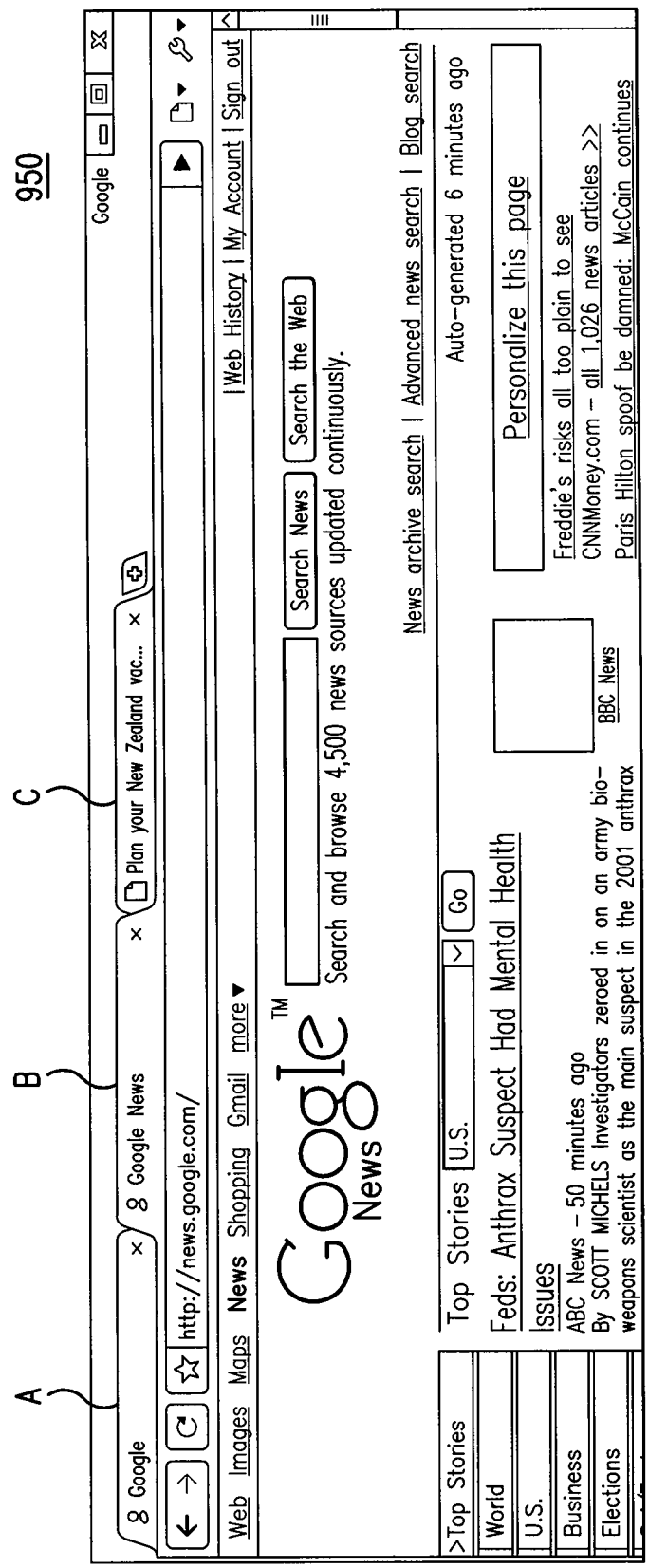

At step 704, rapid cleanup module 218 determines a set of tabs opened by the tab indicated in the input received in step 702. In FIG. 9A, rapid cleanup module 218 determines the tabs opened by tab B. In diagram 900, tabs B' and B'' are opened by tab B.

At step 706, rapid cleanup module 218 closes all tabs in the set of tabs determined in step 704. Step 706 is illustrated in a diagram 950 in FIG. 9B. In diagram 950, tabs B' and B'' have been closed leaving open tabs A, B, and C.

To operate method 700, rapid cleanup module 218 maintains an opener relationship for each tab as is described in the tab selection section above. While an opener relationship may be deleted or deactivated in the ways described above, rapid cleanup module 218 may maintain a copy of this relationship used specifically for the "close all tabs opened by" feature of method 700.

Another method for rapidly closing tabs is illustrated in FIG. 8. FIG. 8 is a flowchart illustrating a method 800 for closing all the tabs opened by a tab. Method 800 begins by receiving an input to close all tabs on one side of a tab at step 802. One example input is illustrated in diagram 1000 of FIG. 10A. Diagram 1000 shows a tabbed browsing interface with a tab 1002. To the right of tab 1002 are tabs 1004, 1006, and 1008. Diagram 1000 also shows a menu 1012. Menu 1012 may be opened by right clicking tab 1002. Menu 1012 includes an option 1010 to "close tabs to the right". When a user selects option 1010, rapid cleanup module 218 may receive a user input at step 802. The user input may indicate a particular tab.

Figure 10A:
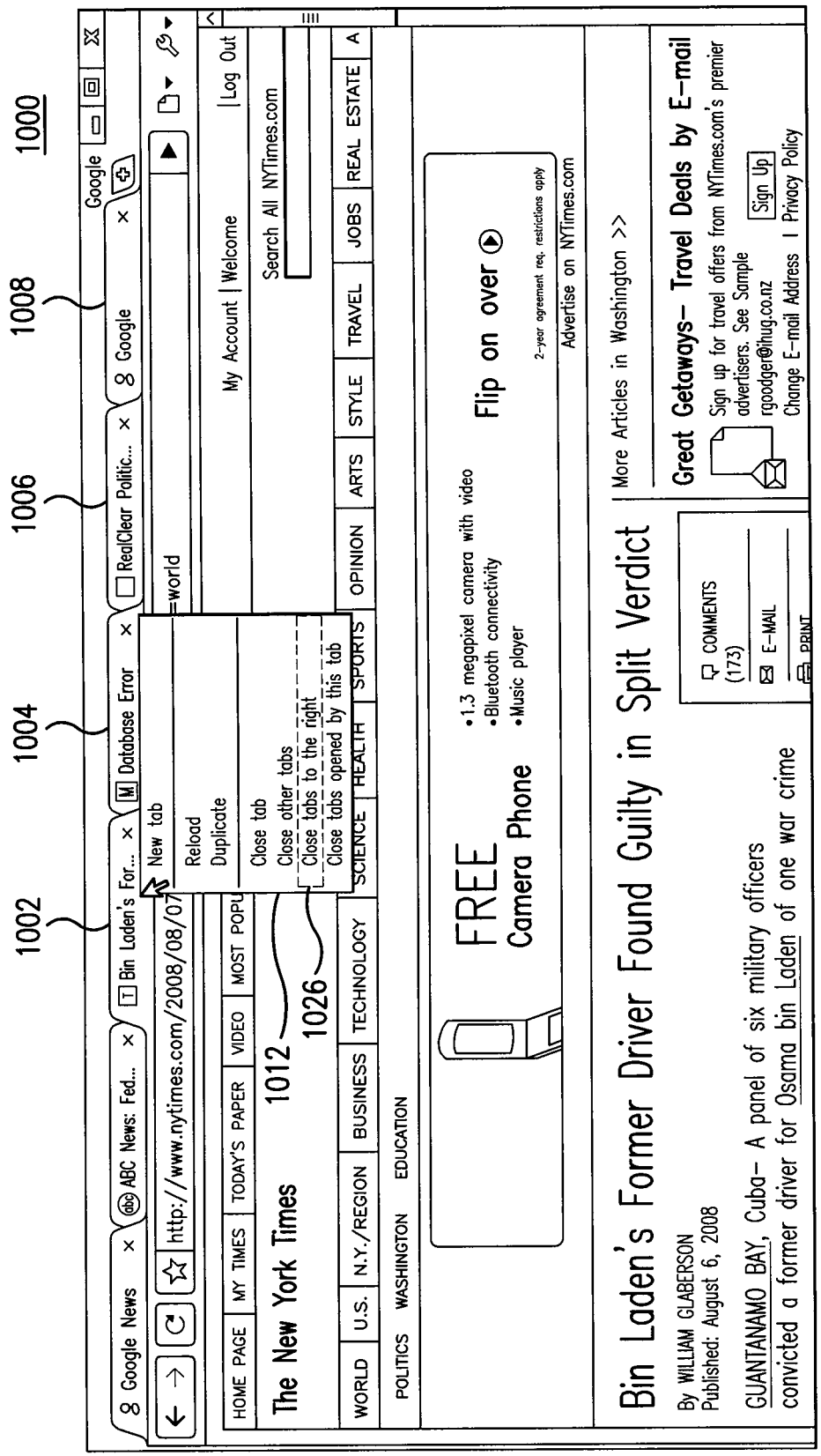
Figure 10B:
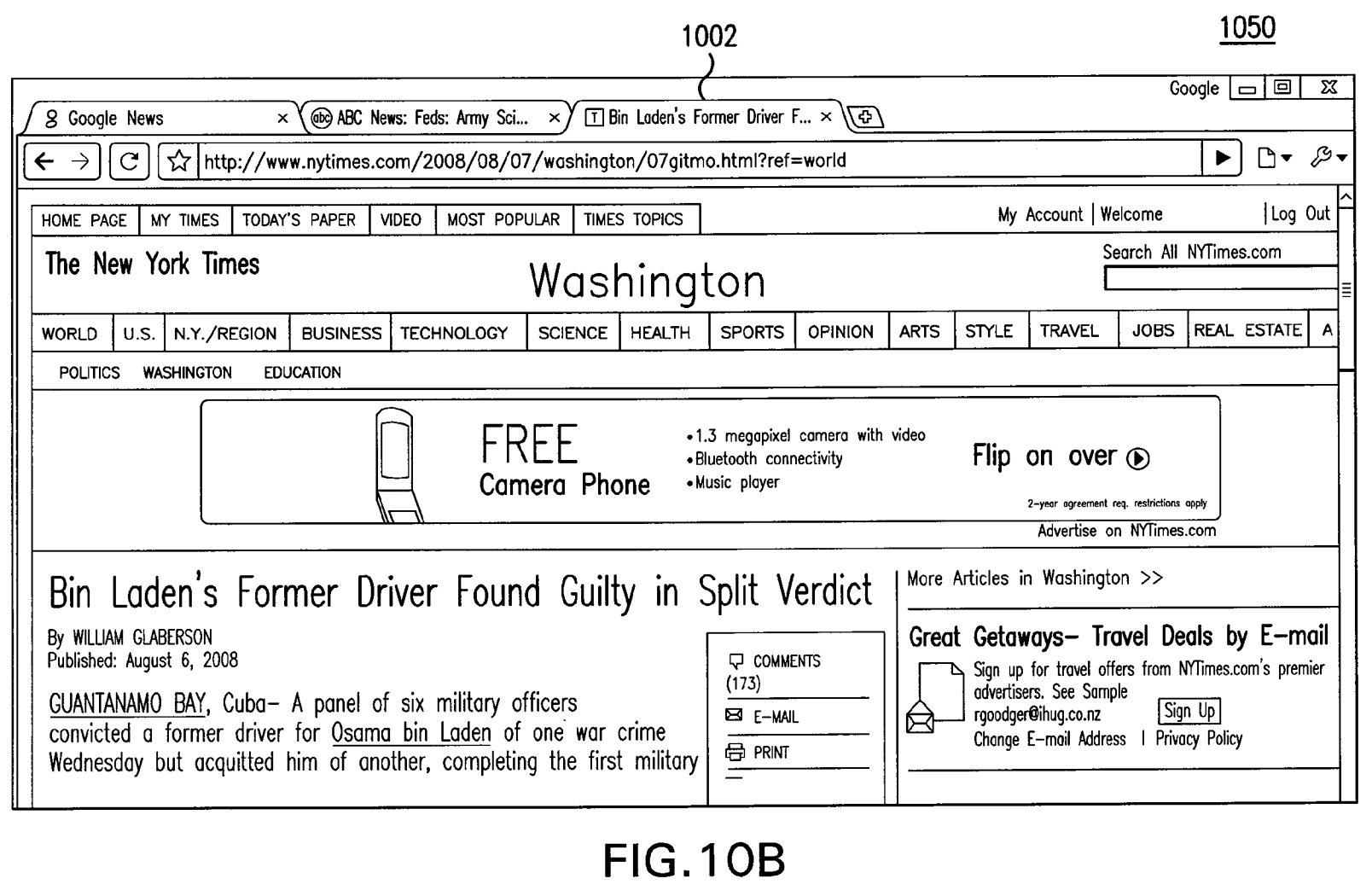

At step 804, rapid cleanup module 218 determines a set of tabs on one side of the tab indicated in the input received in step 802. In FIG. 10A, rapid cleanup module 218 determines the tabs to the right of tab 1002. In diagram 1000, tabs 1004, 1006, and 1008 are to the right of tab 1002.

At step 806, rapid cleanup module 218 closes all tabs in the set of tabs determined in step 804. Step 806 is illustrated in a diagram 1050 in FIG. 10B. In diagram 1050, tabs 1004, 1006 and 1008 have been closed.

By enabling a user to close multiple, likely related tabs at once, embodiments allow a user to clean up accumulated tabs quickly and easily.

Rendering Tabs On Closing

The previous section described rapidly closing multiple tabs in response to a single input. This section describes closing tabs in response to multiple inputs quickly and easily.

Figure 11:
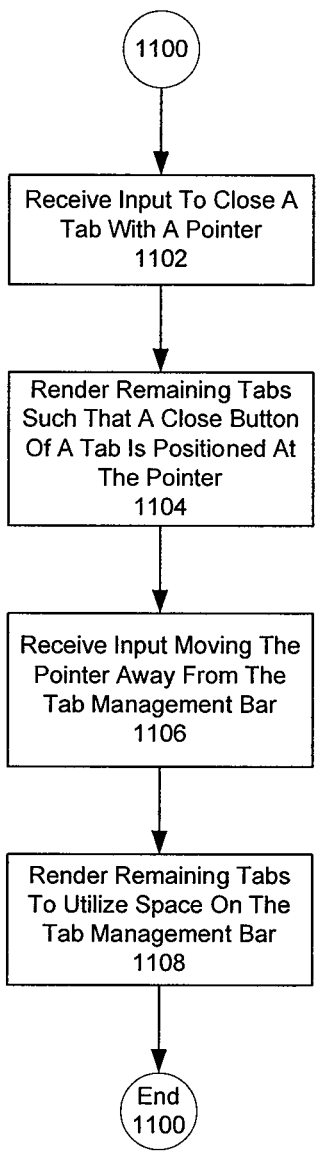
FIG. 11 is a diagram illustrating a method for closing a tab according to an embodiment.

FIG. 11 shows a diagram illustrating a method 1100 for closing a tab according to an embodiment. For clarity, method 1100 is described with respect to browser system 200 and tab refresh module 220 in FIG. 2. However, method 1100 may be used in other systems are a known to those of skill in the art.

Method 1100 starts by receiving an input to close a tab with a pointer at step 1102. For example, a user may position a pointer controlled by a mouse on a close button on a tab. The user may press the mouse button closing the tab.

At step 1104, tab refresh module 220 renders the remaining tabs such that the close button of a tab positioned at the pointer. To render the tabs, the remaining tabs may be enlarged or may be kept the same size as is discussed below.

At step 1106, a user receives input to move the pointer away from the tab management. In response to the input, tab refresh module 220 renders the remaining tabs to utilize space on the tab management area at step 1008. To utilize space on the tab management area, tabs may have a maximum width and a minimum width. As long as there is room, tabs will have their maximum width. When the tab management area is full, the tabs may be shrunken down to their minimum width.

Figure 12A:
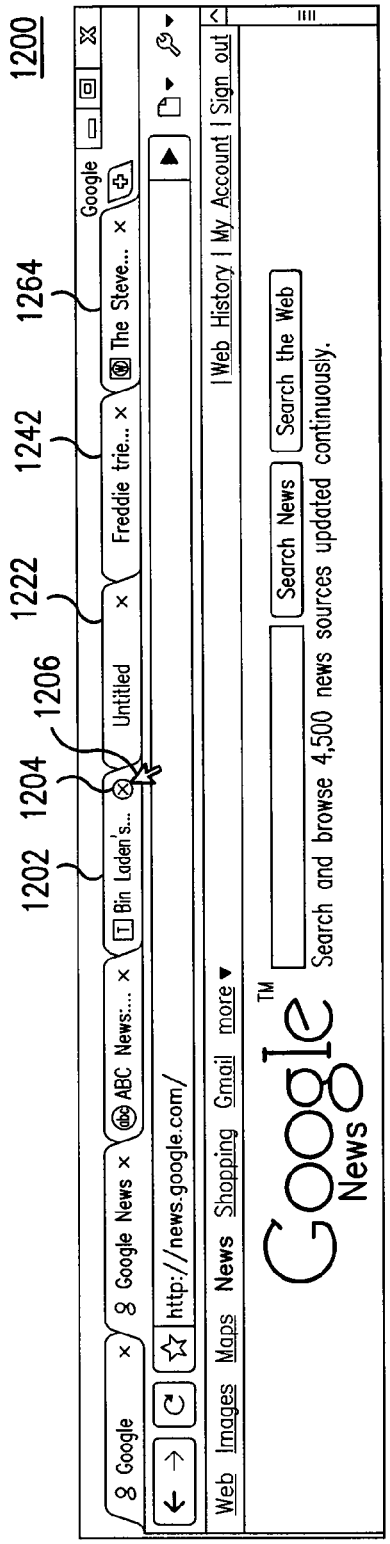
FIGS. 12A-D are diagrams illustrating an example of the method in FIG. 11.
Figure 12B:
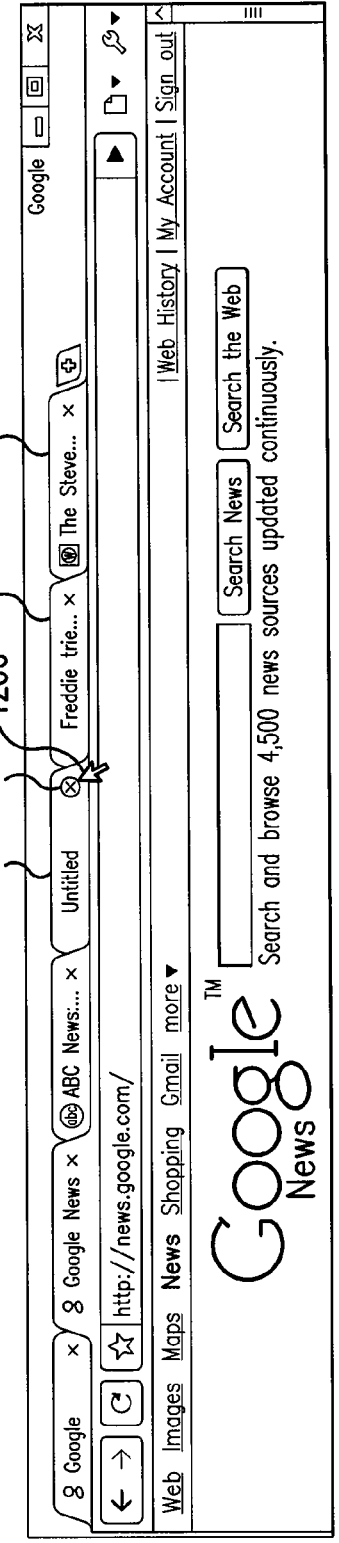

FIGS. 12A-D are diagrams illustrating an example of the method in FIG. 11. FIG. 12A shows a diagram 1200. Diagram 1200 shows a tabbed browsing interface with tabs 1202, 1222, 1242, and 1262. A user has positioned a pointer 1206 over a close button 1204 of tab 1202. When the user selects close button 1204, tab 1202 closes and the tabbed browsing interface appears as shown in FIG. 12B.

FIG. 12B shows a diagram 1220 showing the tabbed browsing interface after tab 1202 has been closed. The tabs could be expanded to utilize additional screen space. However, expanding the tabs would likely position the tabs such that no close button is located at pointer 1206. Users often want to close several tabs sequentially. To close another tab, the user would have to move pointer 1206 to another close button. However, tab refresh module 220 instead renders the tab management area to position a close button of a tab at pointer 1206. In this way, a user does not have to move pointer 1206 to close another tab.

In diagram 1220, tab refresh module 220 renders the tabs to maintain the same width. Effectively tab refresh module 220 merely translates tabs 1222, 1242, and 1262 to the left. This positions the tabs such that a close button 1224 of tab 1222 is at pointer 1206. This method is repeated in FIGS. 12C-D.

Figure 12C:
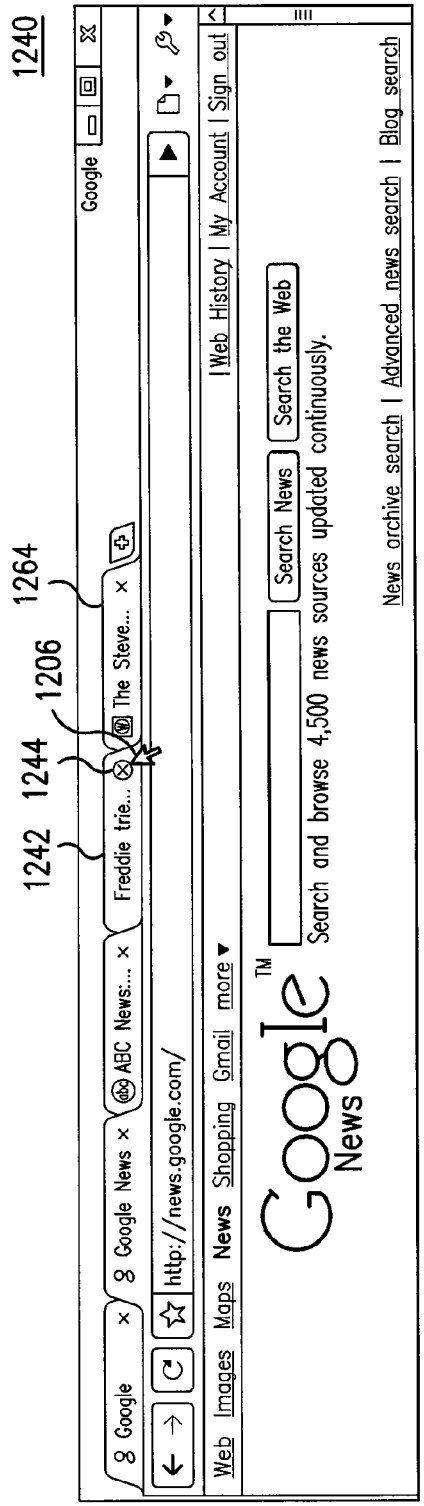
Figure 12D:
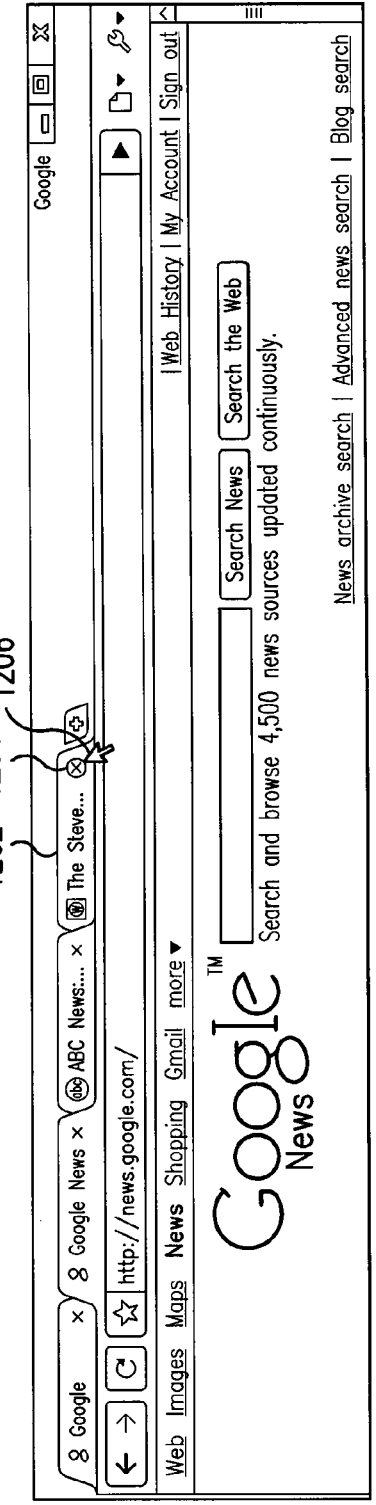

FIG. 12C shows a diagram 1240 showing the tabbed browsing interface after tab 1222 is closed. Tabs 1242 and 1262 have been translated left such that a close button 1244 of tab 1242 is positioned at pointer 1206. Finally, FIG. 12D shows a diagram 1260 showing the tabbed browsing interface after tab 1246 is closed. Tab 1262 has been translated left such that a close button 1264 of tab 1262 is positioned at pointer 1206. In diagram 1206, there are no remaining tabs to the left of tab 1264. So, if a user selects a close button 1264, there are no tabs to translate into a position to be closed by a pointer 1206. The remaining tabs may be enlarged as illustrated in FIGS. 13A-C.

Figure 13A:
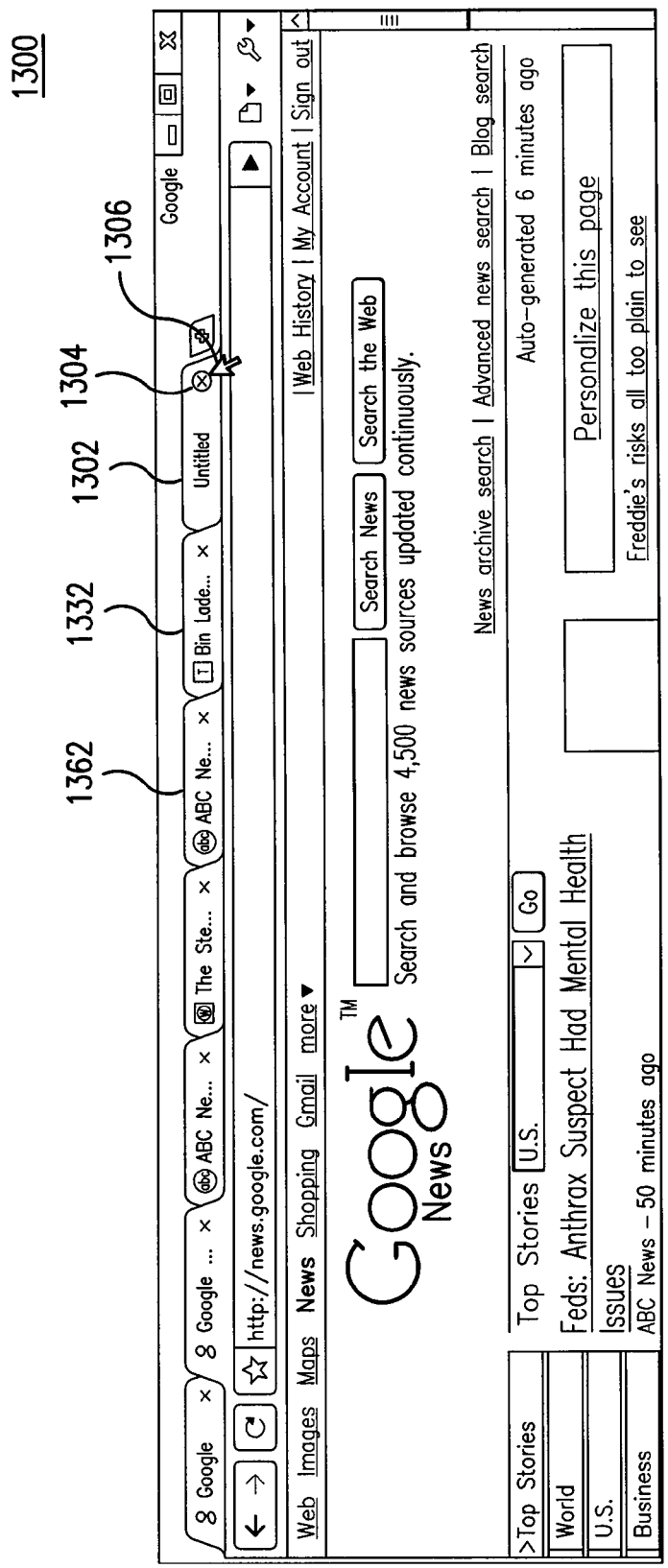
FIGS. 13A-C are diagrams illustrating another example of the method in FIG. 11.
Figure 13B:
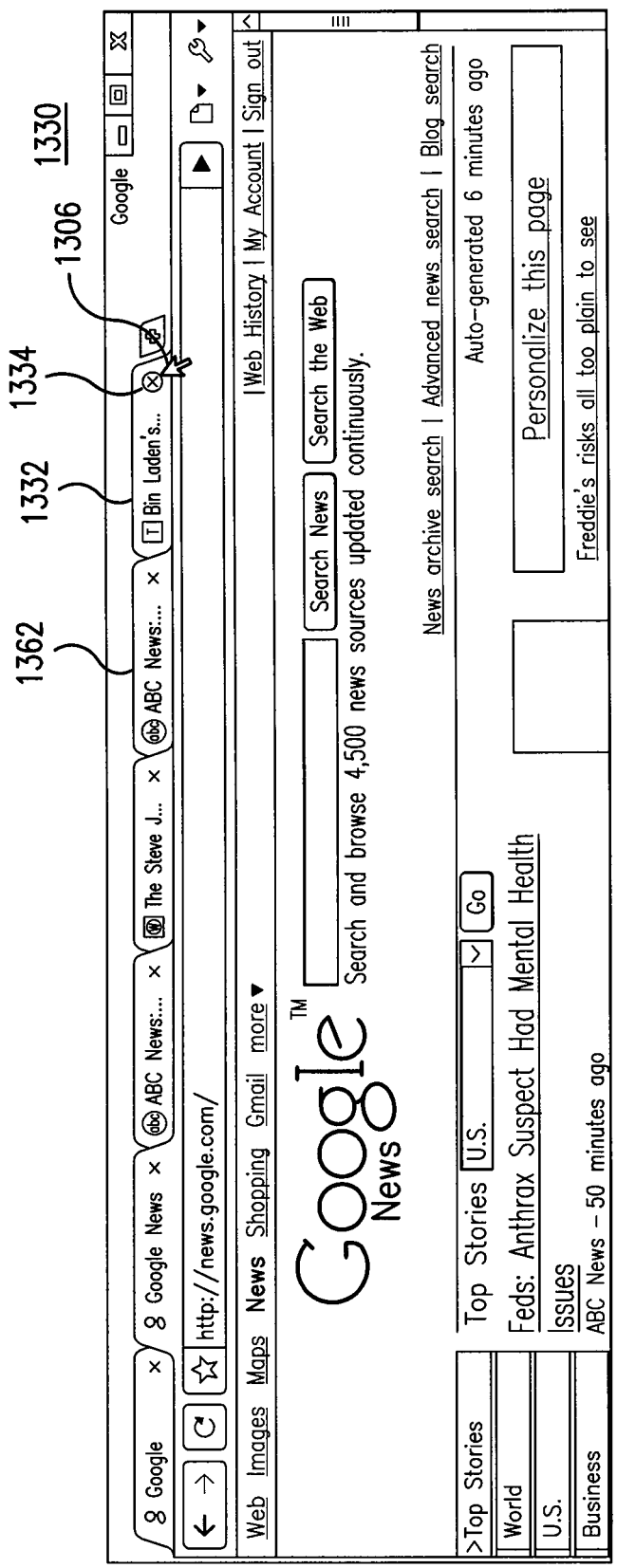
Figure 13C:
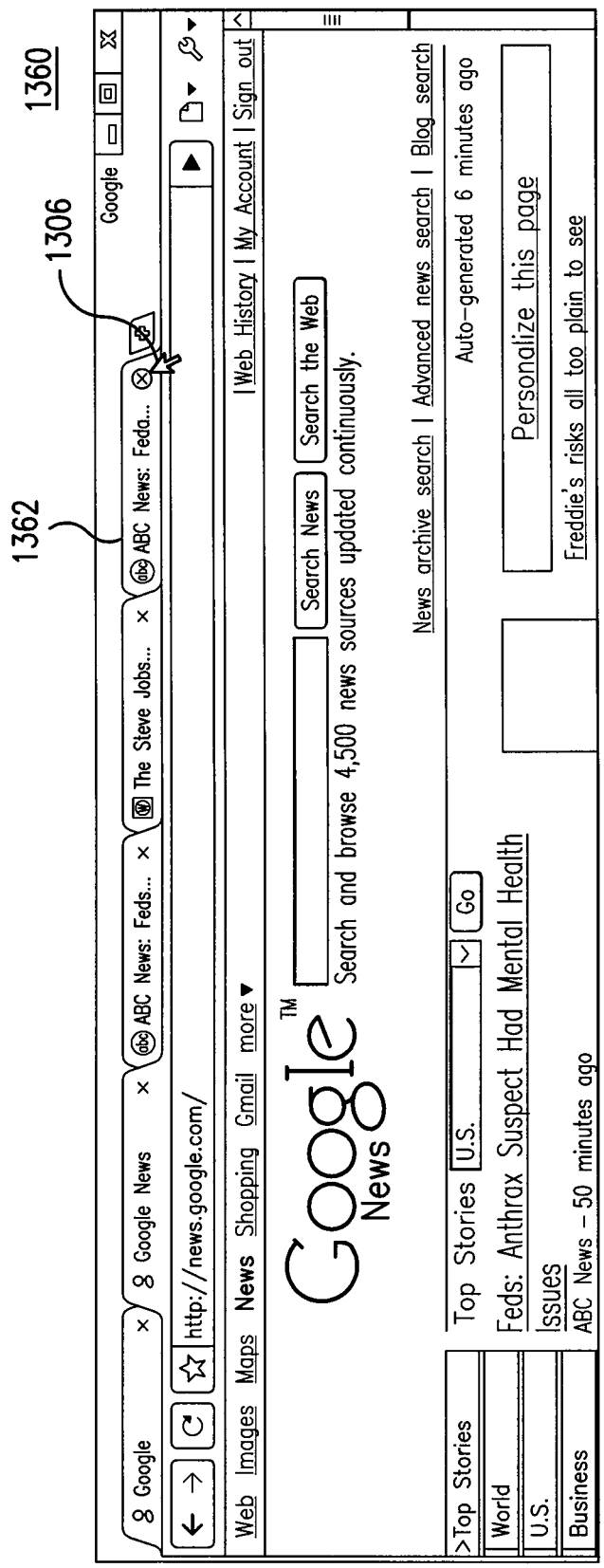

FIGS. 13A-C are diagrams illustrating another example of the method in FIG. 11. FIG. 13A shows a diagram 1300 illustrating a tabbed browsing interface. The tabbed browsing interface includes tabs 1302, 1332, and 1362. Tab 1302 has a close button 1304. When a user selects close button 1304 with a pointer 1306, tab 1302 closes and the tabbed browsing interface may appear as in FIG. 13B.

FIG. 13B shows a diagram 1300 illustrating a tabbed browsing interface with the tabs enlarged. The tabs are enlarged such that each tab maintains an equal width and a close button 1334 of tab 1332 is positioned at pointer 1306. FIG. 13B shows a diagram 1330 illustrating a tabbed browsing interface with the tabs enlarged. Diagram shows that tab 1332 has a close button 1334. When a user selects close button 1334 with a pointer 1306, tab 1306 closes and the tabbed browsing interface may appear as in diagram 1306 of FIG. 13C.

In this way, tab refresh module 220 enables a user to rapidly close tabs in succession.

Conclusion

Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for closing a tab in a browser, comprising:
    (a) receiving, on a computing device, a first user input to select a close button on a tab with a pointer, the pointer located at a screen position;
    in response to receipt of the first user input:
    (b) determining whether a tab management area is full;
    (c) rendering, on the computing device, the tab management area such that a close button of a remaining tab is located at the screen position, wherein the rendering (b) comprises, when the tab management area was determined to be full in (b), translating the remaining tab to the left such that the remaining tab maintains the same width;
    (d) receiving, on the computing device, a second user input to move the pointer away from the tab management area;
    (e) in response to receipt of the second user input, rendering, on the computing device, the tab management area;
    after the rendering (c), but before the receiving (d):
    (f) repeatedly receiving, on a computing device, a plurality of additional user inputs, each user input indicating that the user has selected a close button on a remaining tab with the pointer, the pointer still located at the screen position; and
    (g) for each of the plurality of additional user inputs, rendering, on the computing device, a tab management area such that a close button of a remaining tab is located at the screen position, wherein the rendering (g) comprises, when the tab management area was determined to be full in (b), translating the remaining tab to the left such that the remaining tab maintains the same width,
    whereby the rendering (g) enables repeated closing of tabs in the tab management area without having to move the pointer from the screen position, and
    wherein the computing device comprises at least one processor and memory.

2. The method of claim 1, wherein the rendering (e) comprises, when the tab management area is determined to be full in (b), enlarging the remaining tab to at most a maximum width to utilize more tab management area.

3. A system for tabbed browsing, comprising:
    a computing device comprising a processor and memory;
    a tab opener module, implemented on the computing device, that determines a first opener tab that opens a first tab, determines a second tab opened from the opener tab and positions the first tab adjacent to the second tab;
    a tab manager module, implemented on the computing device, that displays a page associated with a third tab and closes the third tab;
    a tab selector module, implemented on the computing device, that determines a second opener tab, determines a fourth tab opened from the second opener tab, and causes a page associated with the fourth tab opened from the second opener tab to be displayed; and
    a tab refresh module implemented on the computing device and configured to: (a) receive a first user input to select a close button on a tab with a pointer, the close button located at a screen position, and, in response to receipt of the first user input: (b) determine whether a tab management area is full, and (c) render the tab management area such that: (i) a close button of a remaining tab is located at the screen position, and (ii) a remaining tab is translated to the left such that the remaining tab maintains the same width when the tab management area was determined to be full in (b), (d) receive a second user input to move the pointer away from the tab management area, (e) in response to receipt of the second user input, render the tab management area, (f) after the tab management area is rendered (c), but before the second user input is received (d), repeatedly receive a plurality of additional user inputs, each additional user input indicating that the user has selected a close button on a remaining tab with the pointer, the pointer still located at the screen position, and (g) for each of the plurality of additional user inputs, render a tab management area such that: (i) a close button of a remaining tab is located at the screen position, and (ii) when the tab management area was determined to be full in (b), the remaining tab is translated to the left such that the remaining tab maintains the same width, whereby the tab refresh module enables repeated closing of tabs in the tab management area without having to move the pointer from the screen position.

4. The system of claim 3, wherein to render (e) the tab management area in response to the second user input when the tab management area was determined to be full in (b), the tab refresh module enlarges the remaining tab to at most a maximum width to utilize more tab management area.

5. A program storage device readable by a processor, tangibly embodying a program of instructions executable by the processor to perform method steps for closing a tab in a browser, said method steps comprising:

(a) receiving a first user input to select a close button on a tab with a pointer, the pointer located at a screen position;

in response to receipt of the first user input:

(b) determining whether a tab management area is full;

(c) rendering the tab management area such that a close button of a remaining tab is located at the screen position, wherein the rendering (b) comprises, when the tab management area was determined to be full in (b), translating the remaining tab to the left such that the remaining tab maintains the same width;

(d) receiving, on the computing device, a second user input to move the pointer away from the tab management area;

(e) in response to receipt of the second user input, rendering the tab management area;

after the rendering (c), but before the receiving (d):

(f) repeatedly receiving, on a computing device, a plurality of additional user inputs, each additional user input indicating that the user has selected a close button on a remaining tab with the pointer, the pointer still located at the screen position;

(g) for each of the plurality of additional user inputs, rendering, on the computing device, a tab management area such that a close button of a remaining tab is located at the screen position, wherein the rendering (g) comprises, when the tab management area was determined to be full in (b), translating the remaining tab to the left such that the remaining tab maintains the same width, whereby the rendering (g) enables repeated closing of tabs in the tab management area without having to move the pointer from the screen position.

6. The program storage device of claim 5, wherein the rendering (e) comprises, when the tab management area is determined to be full in (b), enlarging the remaining tab to at most a maximum width to utilize more tab management area.

* * * * *